US007328264B2

(12) United States Patent
Babka

(10) Patent No.: US 7,328,264 B2
(45) Date of Patent: Feb. 5, 2008

(54) SYSTEM AND METHOD FOR FRACTIONAL RESOURCE SCHEDULING FOR VIDEO TELECONFERENCING RESOURCES

(75) Inventor: James Joseph Babka, Round Rock, TX (US)

(73) Assignee: Tandberg Telecom AS, Lysaker (NO)

( * ) Notice: Subject to any disclaimer, the term of this patent is extended or adjusted under 35 U.S.C. 154(b) by 580 days.

(21) Appl. No.: 10/193,939

(22) Filed: Jul. 11, 2002

(65) Prior Publication Data
US 2003/0028656 A1 Feb. 6, 2003

Related U.S. Application Data

(60) Provisional application No. 60/309,132, filed on Jul. 31, 2001.

(51) Int. Cl.
*G06F 15/173* (2006.01)
(52) U.S. Cl. ...................................... 709/226
(58) Field of Classification Search ......... 709/223–226
See application file for complete search history.

(56) References Cited

U.S. PATENT DOCUMENTS

| | | | | |
|---|---|---|---|---|
| 4,455,455 | A | * | 6/1984 | Little ................... 379/203.01 |
| 5,530,472 | A | * | 6/1996 | Bregman et al. ........... 370/260 |
| 5,541,639 | A | * | 7/1996 | Takatsuki et al. .......... 348/14.1 |
| 5,594,727 | A | * | 1/1997 | Kolbenson et al. ......... 370/442 |
| 5,812,545 | A | * | 9/1998 | Liebowitz et al. .......... 370/337 |
| 5,862,329 | A | * | 1/1999 | Aras et al. .................. 709/204 |
| 5,867,494 | A | * | 2/1999 | Krishnaswamy et al. ..................... 379/114.15 |
| 5,933,417 | A | * | 8/1999 | Rottoo .................. 379/202.01 |
| 5,951,637 | A | * | 9/1999 | Kuzma ....................... 709/204 |
| 6,064,976 | A | * | 5/2000 | Tolopka ........................ 705/9 |
| 6,185,602 | B1 | * | 2/2001 | Bayrakeri ................... 709/204 |
| 6,377,554 | B1 | * | 4/2002 | Farnsworth et al. ........ 370/252 |
| 2001/0049087 | A1 | * | 12/2001 | Hale .......................... 434/350 |
| 2002/0159394 | A1 | * | 10/2002 | Decker et al. .............. 370/252 |
| 2003/0025787 | A1 | * | 2/2003 | Stephens, Jr. ............ 348/14.09 |

OTHER PUBLICATIONS

Design and implementation of conference scheduling and voting facilities for a multi-media conferencing system, Chan e et al., Nov. 1994.*
Regression-Based Available Bandwidth Measurements, Bob Melander, Mats Bj••orkman, Per Gunningberg, Dept. of Computer Systems, Uppsala University, 2002.*
Measuring bandwidth, Lai, K.; Baker, M., INFOCOM '99. Eighteenth Annual Joint Conference of the IEEE Computer and Communications Societies. Proceedings. IEEE, vol. 1, Iss., Mar. 21-25, 1999, pp. 235-245 vol. 1.*

(Continued)

*Primary Examiner*—Jason Cardone
*Assistant Examiner*—Ajay M Bhatia
(74) *Attorney, Agent, or Firm*—Oblon, Spivak, McClelland, Maier & Neustadt, P.C.

(57) ABSTRACT

The present invention discloses a system and method for reserving fractionally schedulable resources. The system includes a scheduling engine to receive reservation requests. The scheduling engine applies the reservation request to a resource usage table corresponding to a fractionally schedulable resource required by the reservation request. If the fractionally schedulable resource has adequate capacity to comply with the requested reservation, the scheduling engine will add the reservation request to a resource usage table.

14 Claims, 4 Drawing Sheets

OTHER PUBLICATIONS

Beran, J. Sherman, R. Taqqu, M.S. Willinger, W. , Long-range dependence in variable-bit-rate video traffic, This paper appears in: Communications, IEEE Transactions on, Publication Date: Feb./Mar./Apr. 1995, vol. 43, Issue: 234, On pp. 1566-1579.*

Pawan Goyal, Harrick M. Vin, Haichen Chen, Start-time fair queueing: a scheduling algorithm for integrated services packet switching networks, Palo Alto, California, United States, pp. 157-168, Year of Publication: Aug. 28-30, 1996.*

Krunz, M., Bandwidth allocation strategies for transporting variable bit ratevideo traffic, This paper appears in: Communications Magazine, IEEE, Publication Date: Jan. 1999, vol. 37, Issue: 1, On pp. 40-44.*

* cited by examiner

| RESOURCE USAGE TABLE: FSR1 ||||  |
|---|---|---|---|---|
| PERIOD |||| BANDWIDTH USAGE |
| START || END ||  |
| 10/1/2001 | 13:00 | 10/1/2001 | 13:30 | 384 |
| 10/1/2001 | 13:30 | 10/1/2001 | 14:00 | 768 |
| 10/1/2001 | 14:00 | 10/1/2001 | 15:00 | 512 |
| 10/1/2001 | 15:00 | 10/1/2001 | 15:30 | 1152 |
| 10/1/2001 | 15:30 | 10/1/2001 | 16:00 | 384 |

*FIG. 2B*

| DEVICE ATTRIBUTE TABLE ||
|---|---|
| DEVICE | MAXIMUM BANDWIDTH |
| FSR1 | 1152 |
| FSR2 | 768 |

*FIG. 2C*

RESERVATION TABLE

| RESERVATION | REQUESTOR | START | | END | | BANDWIDTH | RESOURCES |
|---|---|---|---|---|---|---|---|
| 1 | USER NUMBER 1 | 10/1/2001 | 13:00 | 10/1/2001 | 14:00 | 384 | FSR1 |
| 1 | USER NUMBER 1 | 10/1/2001 | 13:00 | 10/1/2001 | 14:00 | 128 | FSR2 |
| 2 | USER NUMBER 7 | 10/1/2001 | 13:30 | 10/1/2001 | 16:00 | 384 | FSR1 |
| 3 | CONFERENCE ROOM 2 | 10/1/2001 | 14:00 | 10/1/2001 | 15:00 | 128 | FSR1 |
| 3 | CONFERENCE ROOM 2 | 10/1/2001 | 14:00 | 10/1/2001 | 15:00 | 128 | FSR2 |
| 4 | USER NUMBER 1 | 10/1/2001 | 15:00 | 10/1/2001 | 15:30 | 384 | FSR1 |
| 5 | CONFERENCE ROOM 7 | 10/1/2001 | 15:00 | 10/1/2001 | 15:30 | 384 | FSR1 |

*FIG. 3A*

RESOURCE RESERVATION TABLE: FSR1

| RESERVATION | START | | END | | RESOURCE | BANDWIDTH |
|---|---|---|---|---|---|---|
| 1 | 10/1/2001 | 13:00 | 10/1/2001 | 14:00 | FSR1 | 384 |
| 2 | 10/1/2001 | 13:30 | 10/1/2001 | 16:00 | FSR1 | 384 |
| 3 | 10/1/2001 | 14:00 | 10/1/2001 | 15:00 | FSR1 | 128 |
| 4 | 10/1/2001 | 15:00 | 10/1/2001 | 15:30 | FSR1 | 384 |
| 5 | 10/1/2001 | 15:00 | 10/1/2001 | 15:30 | FSR1 | 384 |

*FIG. 3B*

SYSTEM AND METHOD FOR FRACTIONAL RESOURCE SCHEDULING FOR VIDEO TELECONFERENCING RESOURCES

CROSS REFERENCE TO RELATED APPLICATION

This application claims priority from U.S. Provisional Patent Application Ser. No. 60/309,132 filed Jul. 31, 2001 and entitled, "Fractional Resource Scheduling."

TECHNICAL FIELD

The present disclosure relates in general to the field of managing and operating computer and communication networks and more particularly to a system and method for fractional resource scheduling.

BACKGROUND

Network management is crucial for network systems to be properly utilized. If network management is lacking in a particular system, the resources in that system and the network as a whole, may be either underutilized or overcommitted. Underutilized network resources are a waste of scarce capital. Overcommitted network resources are more prone to failures and may lead to user dissatisfaction and frustration, making the network ineffective.

One way in which network resources may be managed is by providing a system to schedule the usage of one or more network resources. However, today's scheduling systems or "scheduling engines" typically support only binary scheduling. That is, existing scheduling systems typically consider a given resource as a whole unit that is either entirely available or entirely unavailable. This type of scheduling may lead to the underutilization of a resource because the reserved resource is often only partially utilized by the application that is running during the reserved time. For example, in a video network environment a multipoint control unit (MCU) may have a bandwidth that is only partially utilized by a given video conference. However, after the video conference is scheduled, the MCU will be viewed by the scheduling system as unavailable for the reserved period, even though a portion of the MCU's bandwidth is not required by the video conference that is the reserved application.

To deal with the limitations of binary scheduling systems, one approach that may be used is to partition a single resource into a collection of discrete resources which may also be referred to as "subresources". Each subresource is assigned a portion of the resource's capacity, and each subresource is then scheduled separately. However, this approach limits the flexibility of scheduling to only allow scheduling of the predetermined portions of the resource's capacity, and it also requires that the user identify the proper number of subresources to match with their requirements.

SUMMARY

Therefore, a need has arisen for an improved scheduling system to better utilize network resources.

A further need has arisen for a network management system that allows for scheduling multiple applications on a fractionally schedulable resource.

In accordance with teachings of the present disclosure, a system and method are described for reserving fractionally schedulable resources. The system includes a scheduling engine to receive reservation requests. The scheduling engine applies the reservation request to a resource usage table corresponding to a fractionally schedulable resource required by the reservation request. If the fractionally schedulable resource has adequate capacity to comply with the requested reservation, the scheduling engine will add the reservation request to a resource usage table.

In one aspect, the system includes a scheduling engine able to receive resource scheduling requests. The scheduling engine is associated with at least one fractionally schedulable resource that is able to perform multiple parallel tasks. Additionally, a plurality of other resources are connected to the fractionally schedulable resource. More particularly, the fractionally schedulable resource may be a Multipoint Control Unit in a video network with a particular maximum supported bandwidth or a gateway component in a video network having a particular maximum supported bandwidth, while the other resources may be video conferencing endpoints.

In another aspect a method for scheduling fractionally schedulable resources includes receiving a resource reservation request for a fractionally schedulable resource and determining the availability of the requested fractionally schedulable resource. If adequate capacity is available the fractionally schedulable resource is reserved according to the resource reservation request. More particularly, the step of determining the availability of the requested fractionally schedulable resource includes updating an associated resource usage table based upon the resource reservation request and determining whether the resource usage exceeds the resource's bandwidth.

The present invention includes a number of important technical advantages. One technical advantage is providing a scheduling engine for scheduling fractionally schedulable resources. This allows for network resources to be more effectively utilized by employing fractional scheduling without requiring an artificial partitioning of the resource's capacity. Another technical advantage is providing a resource usage table. The resource usage table allows for the management and reservation of multiple applications of fractionally schedulable resources. The resource usage table also facilitates the generation of reports, such as usage reports organized by time period. Additional technical advantages of the present invention are further described in the figures, description and claims.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2B shows a device specific resource usage table in accordance with the present invention;

FIG. 2C shows a device attribute table according to the present invention;

FIG. 3A is a reservation table according to the present invention;

FIG. 3B is a device specific resource reservation table according to the present invention.

DETAILED DESCRIPTION

Preferred embodiments and their advantages are best understood by reference to FIGS. 1 through 4 wherein like numbers are used to indicate like and corresponding parts.

Figure 1:
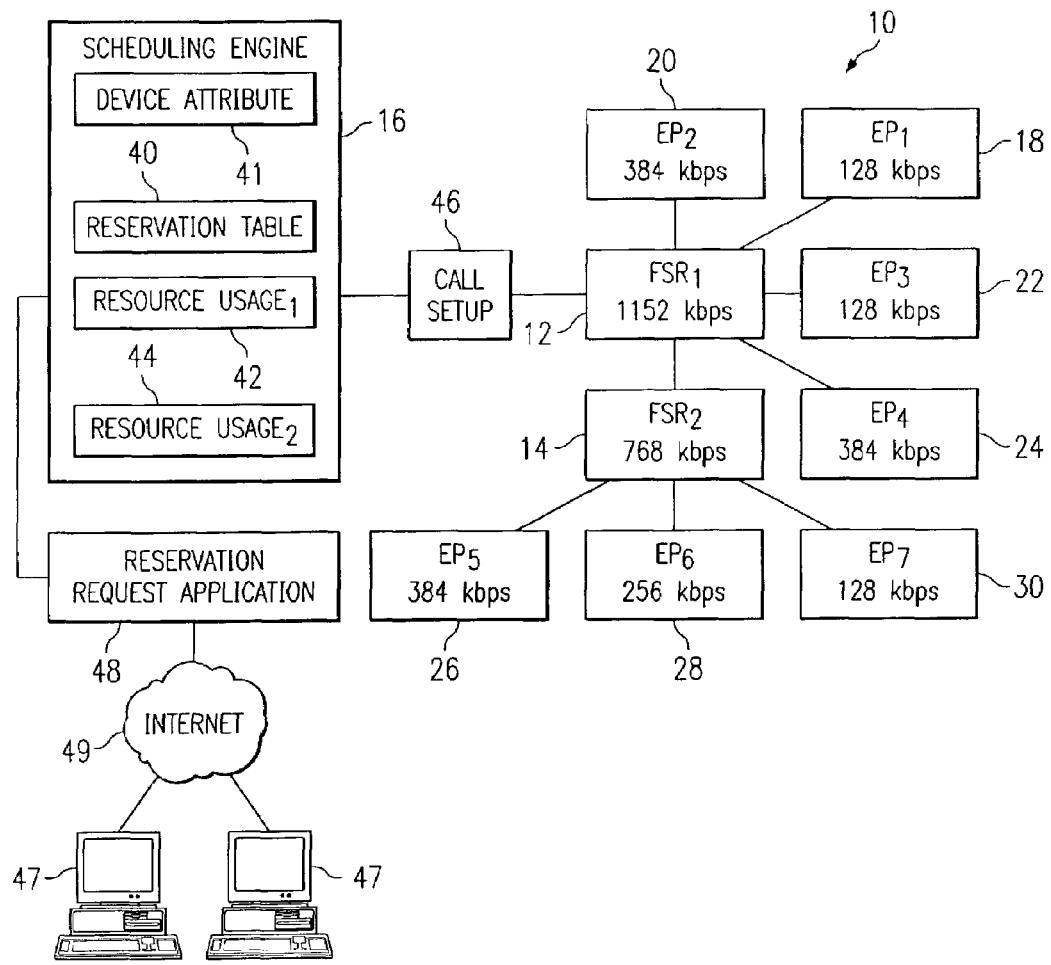
FIG. 1 shows a video network according to the present invention, including a scheduling engine.

Now referring to FIG. 1, a video network, depicted generally at 10, is shown. In the present embodiment video network 10 includes a first fractionally schedulable resource (FSR) 12 connected to a second FSR 14. In the present embodiment first FSR 12 and second FSR 14 may include any network resource or network component that is fractionally schedulable such that the resource may perform multiple parallel tasks. In an example embodiment, FSRs 12 and 14 may have an available bandwidth such that a portion or fraction of that bandwidth may be utilized to perform one task while the remainder of the FSRs bandwidth may be utilized to perform one or more additional tasks. In alternative embodiments, the present system may be implemented for scheduling any component with a resource that can be fractionally scheduled. For example, the present system may be utilized for a system having a plurality of connections which may be fractionally scheduled. Also, the present system may be used to fractionally schedule central processing unit (CPU) power. FSRs 12 and 14 are preferably connected to plurality of network endpoints 18, 20, 22, and 24, and 26, 28, and 30, respectively.

In the present embodiment first FSR 12 has a specified maximum bandwidth of 1152 kilobits per second (kbps) and second FSR 14 has a specified maximum bandwidth of 768 kbps. Also in the present embodiment first FSR 12 may be a multipoint control unit (MCU) which may also be referred to as a multipoint conferencing unit. The function of a multipoint control unit is typically to connect multiple videoconferencing system endpoints into a single conference and manage audio and video from each participant end point within the conference to the others such that group communication is achieved between the multiple endpoints. MCUs may also function to code or decode audio and video information according to known standards, such as the H.320 and H.323 standards promulgated by the International Telecommunication Union (ITU).

In the present embodiment second FSR 14 may be a gateway component. Often, a gateway component functions as a bridge between different types of networks. For example, a gateway component may be used to allow H.320-type devices to communicate with H.323 type devices.

In the present embodiment video network 10 also includes first endpoint 18, second endpoint 20, third endpoint 22, fourth endpoint 24, fifth endpoint 26, sixth endpoint 28 and seventh endpoint 30. Endpoints 18, 20, 22, 24, 26, 28 and 30 may include endpoints within a video network such as videoconferencing terminals for capturing audio and video information to be sent to other endpoints in the network or outside of the network. Each endpoint may be operable to process, code, or otherwise format the audio and/or video information according to known standards in order to be sent as part of a video conference. In an alternative embodiment endpoints 18, 20, 22, 24, 26, 28 and 30 may comprise any suitable network component connected either directly or indirectly to a fractionally schedulable resource. It should be noted that the number and arrangement of endpoint devices included in video network 10 is intended for demonstrative purposes, and in an alternative embodiment the number and arrangement of endpoints can vary significantly.

Each endpoint also has a specified bandwidth. For instance, in the present embodiment, first endpoint 18 has a specified maximum bandwidth of 128 kbps, second endpoint 20 has a specified maximum bandwidth of 384 kbps, third endpoint 22 has a maximum bandwidth of 128 kbps, fourth endpoint 24 has a maximum bandwidth of 384 kbps, fifth endpoint 26 has a maximum bandwidth of 384 kbps, sixth endpoint 28 has a maximum bandwidth of 256 kbps and seventh endpoint 30 has a maximum bandwidth of 128 kbps. Endpoints 18, 20, 22 and 24 are operatively connected to first FSR 12 such that first FSR 12 may selectively connect two or more endpoints 18, 20, 22 and 24. Endpoints 26, 28 and 30 are operatively connected to second FSR 14 such that second FSR 14 may connect these endpoints to the first FSR 12 and the endpoints connected thereto.

First FSR 12 is preferably connected to call set up module 46. In an alternate embodiment, multiple devices including any or all of the devices shown in FIG. 1 may be operably connected to call setup module 46. Call setup module 46 is operably connected with scheduling engine 16. Call setup module 46 functions to establish video conferences and may communicate with scheduling engine 16 to determine which telephone conferences have been scheduled. In the present embodiment, call setup module 46 uses scheduling engine 16 primarily as an advisory tool to determine which video conferences need to be established, at what times, and with which devices. However, in an alternative embodiment, call setup module 46 may incorporate policies requiring calls be scheduled through scheduling engine 16.

Resource reservation requests may be received from any suitable requester. In the present embodiment, resource reservation requests may be received via a reservation request application 48 connected to Communication network 49. Communication network 49 may be any suitable network for communicating with a plurality of users such as an IP network. In the present embodiment, network 49 is an IP network such as the Internet and is further accessible to user stations 47. A user may operate a user station 47, such as a PC, server or work station connected to network 49, to access resource reservation application 48 via Internet 49, to submit a resource reservation request. Additionally, a system administrator or system manager may submit a resource reservation request directly (not expressly shown) to scheduling engine 16. Accordingly, users may to submit a reservation request either directly via reservation request application 48 or indirectly by contacting a network administrator.

Scheduling engine 16 preferably includes reservation table 40, device attribute table 41, first resource usage table 42 and second resource usage table 44. In a preferred embodiment scheduling engine 16 receives incoming resource reservation requests, such as video conference reservation or scheduling requests, from reservation request application 48 or directly from a system administrator. In the present embodiment resource usage tables, 42 and 44, are included which correspond with first FSR 12 and second FSR 14 as shown in FIG. 1. Resource reservation table 40 (as shown in FIGS. 3A and 3B) is maintained by scheduling engine 16 and may include both a record of all resources used by a particular reservation, and may also include device specific reservation tables (as shown in FIG. 3B) that include only resource reservations for a particular device. Scheduling engine 16 also maintains device attribute table 41, also shown in FIG. 2C, to maintain a listing of selected device attributes, capabilities, and features. For example, device attribute table 41 may maintain a record of the maximum bandwidth of each fractionally schedulable resource.

In an alternative embodiment, resource usage tables 42 and 44, as well as reservation table 40 and device attribute table 41 may be maintained separately from scheduling engine 16, such as on an associated server. In another alternative embodiment, a resource usage table may be included for each of a plurality of FSRs associated with scheduling engine 16. In still yet another alternative embodiment, a global resource usage table may be included which combines the resource usage data for multiple FSRs in a single table.

After scheduling engine 16 receives an incoming resource reservation request, scheduling engine 16 preferably determines which resources are involved with the particular request. This step may include determining the end points involved in a given reservation request and identifying the FSRs required to comply with the reservation request. In an alternative embodiment, the required endpoints and/or FSRs may be specifically requested in the resource reservation request or may be determined by a system administrator.

Scheduling engine 16 then queries the corresponding resource usage tables. For instance, if both first FSR 12 and second FSR 14 are required to comply with a particular reservation request, the overlapping resource usage records are obtained from both resource usage tables 42 and 44. Scheduling engine 16 then examines each overlapping usage record to determine whether adding the requested usage to each record would exceed the capacity of the desired resource. If scheduling engine 16 determines that a reservation causes resource usage to exceed capacity, scheduling engine 16 then acts to reject the resource reservation request. In a preferred embodiment, scheduling engine 16 may communicate a notification to the requester and/or the system administrator that the reservation request has been denied. However if the resource usage does not exceed the capacity of the resource, scheduling engine 16 then includes the resource reservation request into reservation table 40, updates the resource usage tables 42 and 44, and may preferably send a confirmation of the reservation to the requestor.

In the present embodiment, the steps involved with updating a resource usage table may vary according to the make up of the existing resource usage table and characteristics of the resource usage request. For a given usage record U (having an associated resource usage value and a specified start time and end time) and a resource usage request C (with a specified resource usage requirement and a start time and end time) where U and C overlap in time, if the period of U falls completely inside the period of C, the resource usage value of U is increased by the resource usage required for C. For instance, in the present embodiment the resource usage requirement is bandwidth required during the period of interest.

In the event that the period of U begins before the start of C and ends before the end of C but after the start time of C, U is updated to change the end time of U to the start time of C. A new usage record, U1, is then added with a start time equal to the start time of C and an end time equal to U's original end time. The usage value of U1 is then set equal to U's original usage value plus the usage required for C. In an alternative embodiment, U may be updated to change the start time of U to equal the start time of C and increase the usage value to equal U's original usage value plus the usage required for C. Also, a new record U1 may be created with a start time equal to the original start time of U, an end time equal to the start time of C, and a usage value equal to the original usage value of U. Other equivalent steps for updating and creating usage records may be embodied in further alternative embodiments.

In the event that U begins after the start time of C and before the end time of C, and ends after the end time of C, a new usage record U1 is added. The new usage record U1 has a start time equal to the original start time of U and has an end time equal to the end time of C. The resource usage value for U1 is set to be the original usage of U plus the required usage of C. Lastly the start time of U is adjusted to be equal to the end time of C and otherwise retains its original end time and resource usage requirement. In an alternative embodiment, U may be updated to have an end time equal to the end time of C and a usage value equal to the original usage value of U plus the usage value of C; a new usage record U1 is also created having a start time equal to the end time of C and an end time equal to the original end time of U. The usage value assigned to U1 is equal to the original usage value of U.

In the event that U begins before the start time of C and ends after the end time of C, several actions take place. First, U is updated to change its ending time to the start time of C. A new record, U1 is added with start and end times matching C and a usage value equal to the usage value of U plus the usage value of C. Finally, another record U2 is added with a start time equal to the end time of C and an end time equal to the original end time of U. The usage value of U2 is set to equal the usage value of U. As one of ordinary skill in the art would note, in this case the original usage record U is updated to become the first of a series of three usage records that cover the original time period of U. Such a person would also note that the original record could be updated to become the second or the third usage record of the series without departing from the scope of the present invention.

Finally, if there is any time interval between the start and end times of C for which there is no corresponding usage record, then for each such time interval a new usage record U is created. The start and end times of U are set to match the start and end times of the uncovered interval, and the usage of U is set equal to the usage value of C.

Alternatively, scheduling engine 16 may receive a request to cancel an existing reservation, such as reservation 1, stored in reservation table 40 (as shown in FIG. 3A, below). The cancellation of an existing reservation may be accomplished through either accessing reservation request application 48 and submitting a reservation cancellation request or by contacting a system administrator. In this example, the reservation table is preferably examined to determine which resources are required to participate in a reservation, as well as the usage required for each resource in the reservation. For each device found in the reservation table, for the reservation to be cancelled, the overlapping resource usage records from 42 and/or 44 are obtained. Each of these records is then updated by subtracting the usage of that resource in that reservation from the usage recorded in the reservation record, and then the record from reservation table 40 corresponding to this device is preferably deleted. In an alternative embodiment, any record whose usage value would normally be updated to a zero value would instead be deleted from the resource usage table. Allowing for reservations to be canceled facilitates keeping the reservation system up to date, thereby allowing the reservation and usage tables to accurately reflect the availability of the FSRs.

Figure 2A:
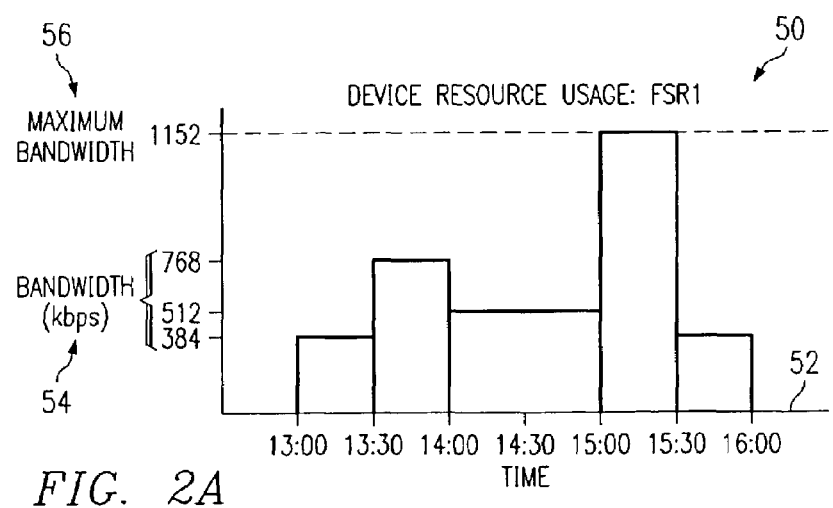
FIG. 2A is a demonstrative graph showing resource usage in accordance with the reservation system of the present invention.

Now referring to FIG. 2A, a graphic representation of a resource usage table depicted generally at 50 is shown. Resource usage graph 50 includes bandwidth 54 shown along the vertical axis and time 52 shown along the horizontal axis. In one embodiment, time 52 may be regularly updated such that time entries from a past period and a lengthier future period, are automatically added in order to facilitate resource reservation requests in the future. For example, time 52 may be regularly updated to contain resource usage data for a time period spanning from a week prior to the present to a year from the present date. Resource usage graph 50 further includes a maximum bandwidth 56 corresponding to the maximum bandwidth of the corresponding FSR as stored in device attribute table 41. In the present embodiment, resource usage graph 50 is demarcated into a series of time intervals corresponding to the different time intervals where resource usage changes. Accordingly, as the usage table (as shown in FIG. 2B, below) is updated, the time intervals corresponding to the time intervals of resource usage are also updated.

Now referring to FIG. 2B, a device specific resource usage table 70 is shown. Resource usage table 70 includes, for a particular FSR, the cumulative scheduled resource usage 78 during periods 72. Periods 72 are delineated with appropriate start 74 and end 76 times. Scheduling engine 16 updates start 74 and end 76 times appropriately after a reservation that makes use of FSR1 12 has been added to or removed from reservation table 40 or when processing a reservation request that refers to FSR1 12 to determine whether a request should be granted.

Scheduling engine 16 may selectively obtain records from resource usage table 42 in order to determine whether a particular resource (in this case, FSR1) will exceed capacity after a resource reservation request is granted. Scheduling engine 16 may also insert, add, or update records into resource usage table 42 in response to a resource reservation request. In one embodiment, scheduling engine 16 may also selectively update and/or delete selected records of resource usage table 42 in response to a resource reservation cancellation or a received end of session notification for a reservation that makes use of FSR1 12. An end of session notification may be sent to scheduling engine in the event that a reserved resource session, such as a video conference, has ended early. This allows the resource usage table to maintain accuracy, thereby maximizing network resources.

Now referring to FIG. 2C, a device attribute table 80 is shown. Device attribute table 80 preferably maintains a listing of FSRs associated with scheduling engine 16 and selected device attributes. In the present embodiment, device attribute table 80 includes a listing of associated FSRs 82 and the maximum bandwidth 84 of each FSR. In an alternative embodiment, device attribute table may include additional or alternative fractionally schedulable attributes of associated devices as well as additional general attributes of the associated devices. Device attribute table 80 may be periodically updated by a system administrator.

Now referring to FIG. 3A a reservation table depicted generally at 40 is shown. The reservation table includes resource reservation information including reservation number 86, requester information 88, start time 89, end time 90, bandwidth requirement 91, and resource 92. Start time 89 preferably includes the day and time at which a particular resource reservation begins. End time 90 preferably includes an ending or stopping day and time for a particular resource reservation. In the present embodiment, resource 92 includes only one FSR affected by a particular resource reservation. For resource reservations which require multiple FSRs, reservation table 40 maintains a separate record for each FSR. For example, reservation number 1 requires both FSR1 and FSR2 which are separately listed in reservation table 40. Maintaining separate records allows the system to more easily cope with resource reservations in which different FSRs have different bandwidth requirements. In an alternative embodiment, reservations requiring multiple FSRs may be condensed into a single record. In another embodiment, bandwidth usage for particular FSRs may be kept in a table separate from the reservation table, but then joined to the data in the reservation table at run time. In another embodiment, additional resource attributes may be listed for a reservation. In yet another embodiment, the reserved attribute (such as band width) and the amount of that attribute required are each listed in a separate column of reservation table 40.

Now referring to FIG. 3B, a device specific resource reservation table 94 is shown. Device specific reservation table includes reservation number 86, start 89 and end 90 times, resource 92, and bandwidth requirement 91. Device specific reservation table 94 is preferably generated from the information contained in reservation table 40 for a single FSR, in this case, FSR1. The device specific reservation information may then by used to generate device specific resource usage table 42. In an alternative embodiment, the step of creating a device specific reservation table may be skipped by obtaining reservation information for a specified device from reservation table 40 and generating resource usage table 42 without the use of device specific reservation table 94. Similar to FIG. 3A, in an alternative embodiment device specific reservation table 94 may include alternate or additional device attributes for reservation. In another embodiment device specific reservation table 94 may display the reserved attribute (such as band width) and the amount of that attribute required in separate columns. For instance, for a particular reservation the type of attribute being reserved is listed in a column and the value of the resource being requested is listed in an adjacent column.

Figure 4:
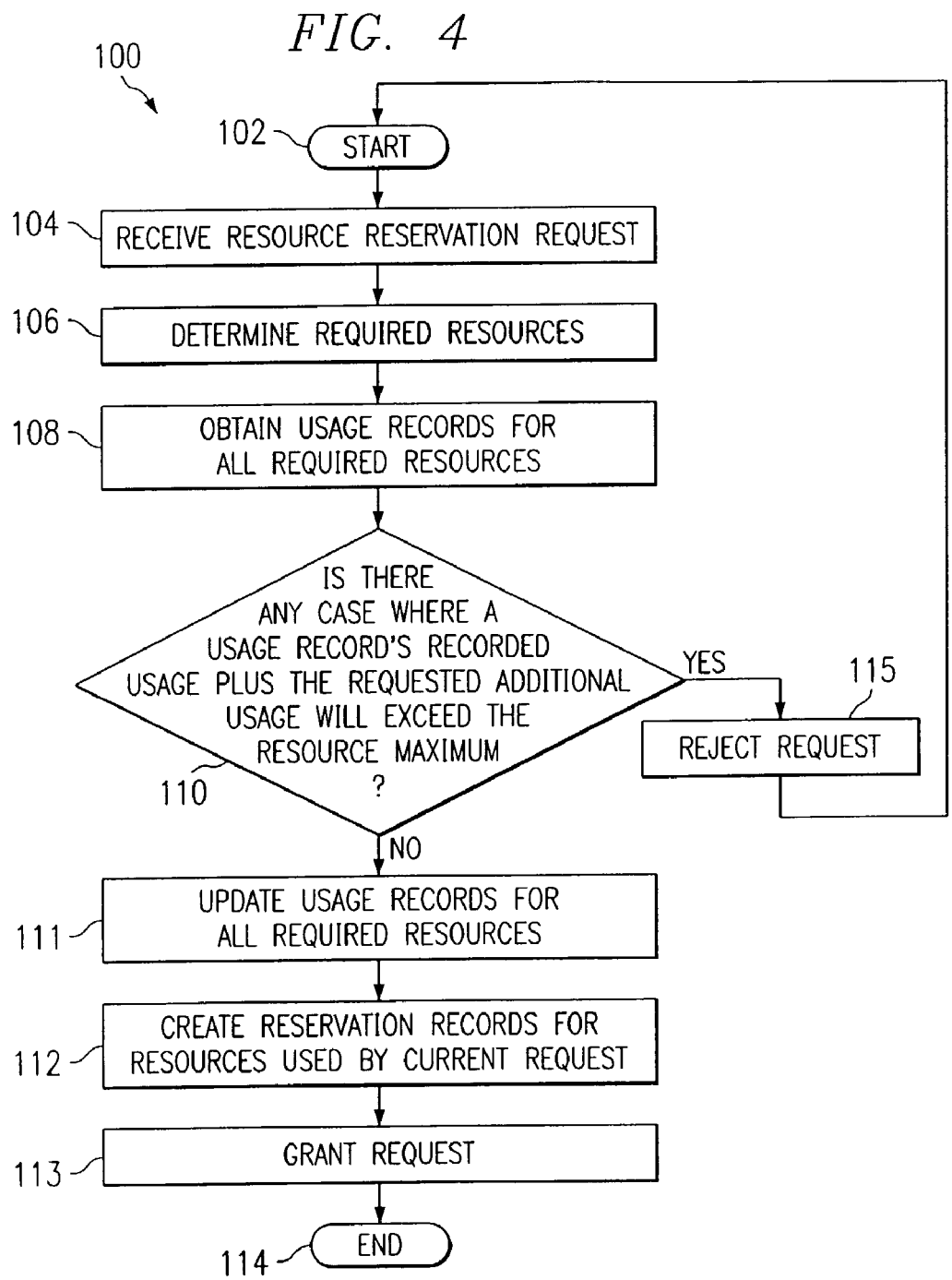
FIG. 4 shows a flow diagram of a scheduling method according to the present invention.

Now referring to FIG. 4, a flow diagram of a resource scheduling method is depicted at 100. Resource scheduling method 100 begins at 102. First a method includes receiving a resource reservation request 104. This step may preferably include receiving a resource reservation request from a reservation request application (as shown in FIG. 1) such as a web page or similar interface that allows a user to submit a request through a network. This step may also include receiving a reservation request directly from a network administrator. Next, the method involves determining which FSRs are required to meet the requirements of the received resource reservation request 106. This step may include utilizing a network utility to determine which FSRs are required to imply with a reservation request. Alternatively, the required FSRs may be identified by a network administrator familiar with the network. Also, the reservation request web page may also allow a user to indicate the required FSRs for a particular reservation request.

Following this step the received resource reservation request is analyzed with respect to the resource usage table corresponding to the effected resources 108. In the event that multiple resources are required to comply with a request, the reservation request may preferably be analyzed with respect to each respective resource usage table. After calculating the effect of the reservation on the appropriate resource usage table or tables, the scheduling engine determines whether any of the effected FSRs will exceed capacity 110, with the addition of the new resource reservation. If any FSR will exceed capacity, the resource reservation request is rejected 115 and the system awaits the receipt of a new resource reservation request 102. Additionally, the system may send a notice to the requestor that the reservation request has been rejected. Such a notification may be sent by email or another suitable method.

However, if the resource usage does not exceed capacity, the resource tables are then updated for all the required resources associated with the request 111. The reservation is then added to the appropriate resource reservation tables 112. The request may then be formally granted 113 by sending an appropriate notification to the requester.

In an alternative embodiment, resource usage table 42 may be periodically queried (not expressly shown) by a call set-up component (as shown in FIG. 1) to aid in the placement of calls in a video network.

In operation, scheduling engine 16, having previously scheduled resources according to reservation table 40, may receive a resource reservation request for first FSR 12, for a period between 14:30 and 15:15 on 10.1.01, requiring a bandwidth of 384 kbps. Scheduling engine 16 then preferably applies the reservation to the resource usage table 42. During the period between 15:00 and 15:15, the request resource will exceed its maximum capacity. The request is therefore rejected and resource usage table 42 is restored to its original state.

Next, scheduling engine 16, may receive a resource reservation request for first FSR 12, for a period between 13:15 and 14:30 on 10.1.01, requiring a bandwidth of 384 kbps. Scheduling engine 16 then preferably applies the reservation to the resource usage table 42. The application of the resource reservation request indicates that the requested resource will not exceed its maximum capacity. The request is therefore accepted and resource usage table 42 is updated to reflect the addition of this resource reservation request. Reservation table 40 is then updated to reflect the accepted reservation and the reservation request may then be granted.

Although the disclosed embodiments have been described in detail, it should be understood that various changes, substitutions and alterations can be made to the embodiments without departing from their spirit and scope.

What is claimed is:

1. A system for scheduling networked video teleconferencing resources, comprising:
   at least one fractionally schedulable video teleconferencing resource having a maximum bandwidth and configured to simultaneously conduct a first video teleconference between first and second endpoints, via a first portion of said maximum bandwidth, and a second video teleconference between third and fourth endpoints, via a second portion of said maximum bandwidth; and
   a video teleconferencing scheduling engine configured to receive at different times a first and second video teleconferencing resource scheduling request corresponding to the simultaneous first and second video teleconferences, and to maintain a video teleconferencing resource usage table including a usage record identifying, by task and by requestor, one of a portion of the maximum bandwidth in use during a first predetermined window of time and a portion of the maximum bandwidth reserved for future use in a second predetermined window of time equal in length to the first predetermined window of time, wherein
   each usage record includes a corresponding task start time, task end time, total amount of reserved bandwidth, and a reserved resource identifier;
   each video teleconferencing resource scheduling request includes a corresponding requested task start time, task end time, total amount of requested bandwidth, and a requested resource identifier; and
   the video teleconferencing scheduling engine is configured to compare each video teleconferencing resource scheduling request in order of time of receipt to a stored usage record, and to individually grant each video teleconferencing resource scheduling request only if a grant will not result in an assignment within one of said first and second predetermined periods of time of a total bandwidth of the fractionally schedulable video teleconferencing resource greater than the maximum bandwidth of the fractionally schedulable video teleconferencing resource.

2. The system of claim 1, wherein the fractionally schedulable video teleconferencing resource is configured to connect with a plurality of video teleconferencing endpoint resources.

3. The system of claim 2 wherein the fractionally schedulable video teleconferencing resource further comprises a Multipoint Control Unit having a maximum bandwidth.

4. The system of claim 2 wherein the fractionally schedulable video teleconferencing resource further comprises a video teleconferencing gateway having a maximum bandwidth.

5. The system of claim 2 wherein the fractionally schedulable video teleconferencing resource further comprises a system having a plurality of video teleconferencing connections.

6. The system of claim 2 wherein the fractionally schedulable video teleconferencing resource further comprises a processor having a maximum processing power.

7. The system of claim 2 wherein the plurality of video teleconferencing endpoint resources comprise endpoint resources within a video teleconferencing network.

8. The system of claim 2 wherein the fractionally schedulable video teleconferencing resource further comprises a ITU standard H.320 compliant video teleconferencing resource having a bandwidth.

9. The system of claim 2 wherein the video teleconferencing scheduling engine is configured to determine the resource usage of a fractionally schedulable video teleconferencing resource for a requested period.

10. The system of claim 2 wherein the video teleconferencing scheduling engine is configured to receive video teleconferencing resource scheduling requests from a network administrator.

11. The system of claim 2 further comprising the video teleconferencing scheduling engine to receive video teleconferencing resource scheduling requests from a video teleconferencing reservation request application.

12. The system of claim 2 further comprising a video teleconferencing reservation request application coupled to the video teleconferencing scheduling engine for submitting video teleconferencing resource scheduling requests and accessible to a communications network.

13. A device for scheduling at least one fractionally schedulable video teleconferencing resource having a maximum bandwidth and configured to simultaneously conduct a first video teleconference between first and second endpoints via a first portion of said maximum bandwidth and a second video teleconference between third and fourth endpoints via a second portion of said maximum bandwidth, comprising:
   a video teleconferencing scheduling engine configured to receive at different times a first and second video teleconferencing resource scheduling request corresponding to the simultaneous first and second video teleconferences, and to maintain a video teleconferencing resource usage table including a usage record identifying, by task and by requestor, one of a portion of the maximum bandwidth in use during a first predetermined window of time and a portion of the maximum bandwidth reserved for future use in a second predetermined window of time equal in length to the first predetermined window of time, wherein each usage record includes a corresponding task start time, task end time, total amount of reserved bandwidth, and a reserved resource identifier;

each video teleconferencing resource scheduling request includes a corresponding requested task start time, task end time, total amount of requested bandwidth, and a requested resource identifier; and the video teleconferencing scheduling engine is configured to compare each video teleconferencing resource scheduling request in order of time of receipt to a stored usage record, and to individually grant each video teleconferencing resource scheduling request only if a grant will not result in an assignment within one of said first and second predetermined periods of time of a total bandwidth of the fractionally schedulable video teleconferencing resource greater than the maximum bandwidth of the fractionally schedulable video teleconferencing resource.

14. A method for scheduling at least one fractionally schedulable video teleconferencing resource having a maximum bandwidth and configured to simultaneously conduct a first video teleconference between first and second endpoints via a first portion of said maximum bandwidth and a second video teleconference between third and fourth endpoints via a second portion of said maximum bandwidth, comprising:

receiving at different times a first and second video teleconferencing resource scheduling request corresponding to the simultaneous first and second video teleconferences;

maintaining a video teleconferencing resource usage table including a usage record identifying, by task and by requestor, one of a portion of the maximum bandwidth in use during a first predetermined window of time and a portion of the maximum bandwidth reserved for future use in a second predetermined window of time equal in length to the first predetermined window of time, wherein each usage record includes a corresponding task start time, task end time, total amount of reserved bandwidth, and a reserved resource identifier, and each video teleconferencing resource scheduling request includes a corresponding requested task start time, task end time, total amount of requested bandwidth, and a requested resource identifier;

comparing each video teleconferencing resource scheduling request in order of time of receipt to a stored usage record; and individually granting each video teleconferencing resource scheduling request only if a grant will not result in an assignment within one of said first and second predetermined periods of time of a total bandwidth of the fractionally schedulable video teleconferencing resource greater than the maximum bandwidth of the fractionally schedulable video teleconferencing resource.

* * * * *